C. A. CARLSON.
WINDSHIELD.
APPLICATION FILED AUG. 6, 1921.
1,434,871. Patented Nov. 7, 1922.
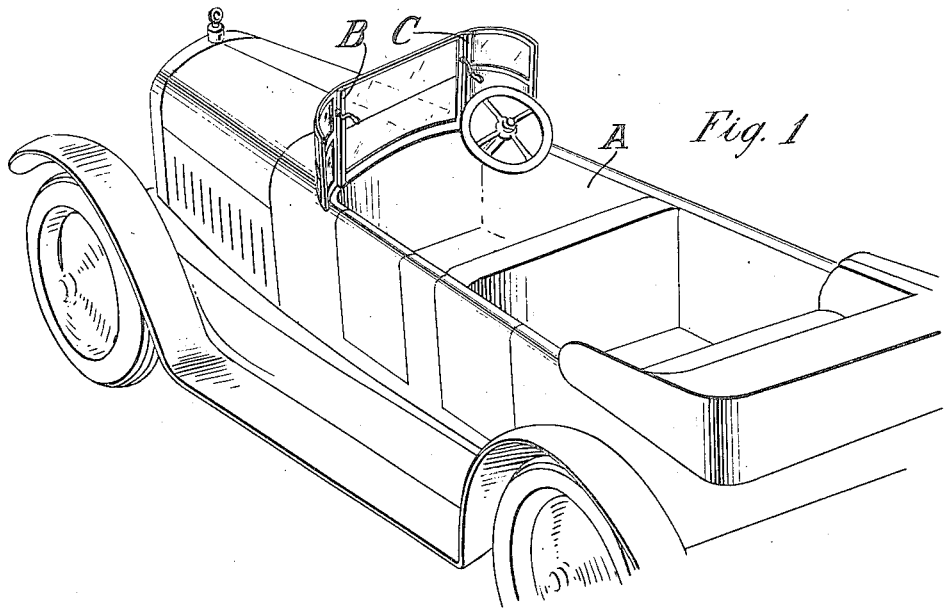
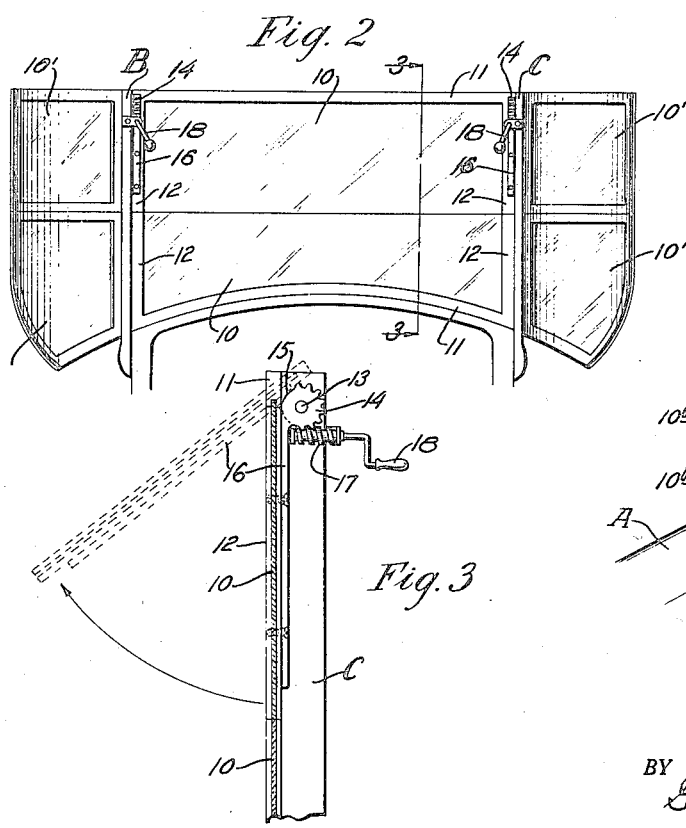
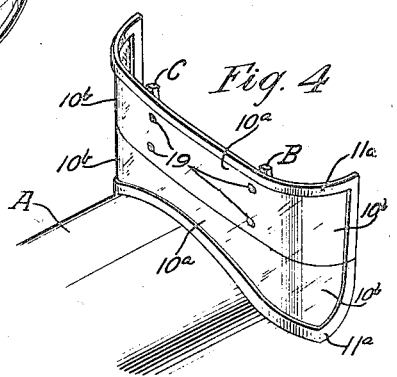
INVENTOR.
Carl A. Carlson
BY
G. H. Braddock
ATTORNEY Patented Nov. 7, 1922.

1,434,871

UNITED STATES PATENT OFFICE.

CARL A. CARLSON, OF BRIDGEPORT, CONNECTICUT.

WINDSHIELD.

Application filed August 6, 1921. Serial No. 490,266.

*To all whom it may concern:*

Be it known that CARL A. CARLSON, a subject of the King of Sweden, and resident of Bridgeport, in the county of Fairfield and State of Connecticut, has invented certain new and useful Improvements in Windshields, of which the following is a specification.

This invention relates to a new and improved automobile wind shield.

An automobile wind shield as customarily constructed includes uprights extending from the body of the automobile, and a pair of suitably mounted panes of glass situated for their full lengths between said uprights, either or both of said panes of glass, together with their frames, being adjustably supported in the uprights to be swung forwardly or rearwardly. Heretofore, to provide additional protection from the elements for occupants of a car, auxiliary wind shields have been provided, and the same have usually been adjustably secured to the uprights of automobile wind shields to be located at the sides of automobiles and forwardly of the drivers thereof. But auxiliary wind shields are objectionable for a number of reasons some of which are: (1) in the case of every type of auxiliary shield with which I am familiar, spaces are necessarily left between the uprights of the ordinary shield and said auxiliary shields when the same are mounted for use, leaving passage for rain, dust, or wind to enter the automobile; (2) the fittings required to properly mount auxiliary shields upon the uprights without permanently damaging the material of the frame have been found in practice to be quite expensive; and (3) even with the best of fittings, auxiliary shields are liable to become removed from their set positions.

It is an object of the present invention to provide occupants of automobiles with protection from the elements additional to and more reliable than that afforded by a wind shield as customarily constructed and auxiliary wind shields used in connection therewith, and with these ends in view, I have devised a novel and inexpensive wind shield, now to be fully described and hereinafter to be specifically claimed, which includes as an integral part thereof suitably constructed wings adapted to be located at the sides of an automobile and forwardly of the driver in much the same manner as are auxiliary wind shields, but presenting none of the objectionable features of auxiliary shields, the efficient wind shield of this invention, in fact, being capable of production at but slightly greater expense than an ordinary wind shield.

A further object of the invention is to provide simple and practical means whereby the improved wind shield can be adjusted.

Other objects and advantages will appear as the description proceeds.

In the accompanying drawing forming a part of this specification,

Fig. 1 is a perspective view of an automobile having thereon a wind shield embodying the features of the invention;

Fig. 2 is a rear elevational view of the wind shield;

Fig. 3 is an enlarged, fragmentary sectional view on line 3—3 in Fig. 2, looking in the direction of the arrows; and Fig. 4 is a perspective view of a portion of an automobile body having thereon a variant form of wind shield made in accordance with the principles of the invention.

In said drawing, A denotes an automobile body, and B and C denote, respectively, vertically arranged uprights extending from adjacent opposite sides of the front portion of said body to serve as supports for the improved wind shield.

The wind shield of the invention preferably consists of an upper and a lower section either or both of which may be adjustably mounted, as is customary, and each section includes a body portion spanning the distance between the uprights B and C and adapted to function as does an ordinary wind shield and wings integral with and extending from the ends of said body portion to be located at the opposite sides of an automobile, preferably forwardly of the driver thereof, said wings being desirably of a smoothly curved conformation to extend rearwardly of the automobile body when the wind shield is in its position of use. See Fig. 1.

In the embodiment of the invention disclosed in Figs. 1 and 2, each section of the wind shield consists of three panes of glass all incorporated in a single structure. In the instance of each section there is a flat pane 10 adapted to span the approximate distance between the uprights B and C, said panes 10 functioning as does an ordinary wind shield, and two curved panes, denoted by 10', located at opposite ends of the pane 10 to be positioned beyond the uprights B and C and at opposite sides of an automobile body, as will be understood, there being frames 11 in which all of said panes of the different sections are suitably mounted, and said frames each desirably including interiorly positioned side members 12 adapted to be arranged in alignment with the uprights B and C.

In the embodiment of the invention disclosed in Fig. 4, each section consists of a single pane of glass and a frame therefor, said pane including a flat portion $10^a$ spanning the distance between the uprights B and C, and curved portions $10^b$ located at opposite sides of the automobile body in the manner already described, there being in each instance a suitable frame $11^a$ for supporting said single pane.

The sections of the wind shield of the invention may be mounted upon the uprights B and C in any dependable manner, and either or both of the sections may be adjustable.

As shown, said sections are carried by the forward faces of the uprights, the lower section being fixed in stationary position, and the upper section being hingedly supported to have forward and rearward swinging movement as will be most clear from Fig. 3. Numeral 13 denotes studs arranged in the uprights B and C and projecting toward each other, 14 denotes mutilated gears rotatably mounted upon said studs and fixed, as at 15, to the upper portions of arms 16 themselves attached in suitable manner to the members 12 of said upper section, 17 denotes worms mounted upon the uprights B and C to mesh with the teeth of the gears 14, and 18 denotes handles for rotating the worms. Obviously, the handles 18 can be rotated to swing the upper section as a whole on its hinges either toward or from the uprights, as suggested in full and dotted lines in Fig. 3.

The adjustments of the upper section of the wind shield of Fig. 4 can be made in the manner just described, except that the arms 16 are secured to the pane of glass itself, as indicated at 19, instead of to the members 12.

Having thus fully described the invention, what I claim as new and desire to secure by Letters Patent is:

1. In combination with uprights, a wind shield comprising a body portion and wings included in a single structure, said body portion spanning the distance between said uprights, said wings located at the ends of said body portion and curving rearwardly beyond said uprights at the sides thereof, and each wing being integral with said body portion to constitute a continuation thereof.

2. In combination with uprights, a wind shield comprising a body portion and wings included in a single structure, said body portion spanning the distance between said uprights, said wings located at the ends of said body portion and curving rearwardly beyond said uprights at the sides thereof, each wing being integral with said body portion to constitute a continuation thereof, and means for swinging said structure forwardly of said uprights.

3. In combination with uprights, a wind shield comprising a body portion and wings included in a single structure, and means for adjusting said structure upon said uprights, said body portion spanning the distance between said uprights, said wings located at the ends of said body portion and curving rearwardly beyond said uprights at the sides thereof, each wing being integral with said body portion to constitute a continuation thereof, and said means consisting of a gear rotatably mounted upon said uprights and having attachment with said wind shield, a worm meshing with said gear, and a device for rotating said worm.

Signed at Bridgeport, in the county of Fairfield, and State of Connecticut, this 5th day of August, A. D., 1921.

CARL A. CARLSON.